(12) United States Patent
Ulmer

(10) Patent No.: US 8,378,809 B2
(45) Date of Patent: Feb. 19, 2013

(54) NETWORK WITH SWITCHING CONTROL UNIT FOR DISCONNECTING TERMINALS FROM NETWORK VOLTAGE

(75) Inventor: Daniel Ulmer, Herrenberg (DE)

(73) Assignee: IT-Designers GmbH, Esslingen (DE)

( * ) Notice: Subject to any disclaimer, the term of this patent is extended or adjusted under 35 U.S.C. 154(b) by 540 days.

(21) Appl. No.: 12/665,440

(22) PCT Filed: Jun. 14, 2008

(86) PCT No.: PCT/EP2008/004804
§ 371 (c)(1), (2), (4) Date: Dec. 18, 2009

(87) PCT Pub. No.: WO2008/155076
PCT Pub. Date: Dec. 24, 2008

(65) Prior Publication Data
US 2010/0181835 A1   Jul. 22, 2010

(30) Foreign Application Priority Data
Jun. 20, 2007   (DE) .......................... 10 2007 028 180

(51) Int. Cl.
*G08B 1/08* (2006.01)
*H04M 11/04* (2006.01)
*H04Q 1/30* (2006.01)

(52) U.S. Cl. ........................... 340/538; 307/85; 307/139

(58) Field of Classification Search .................. 340/538; 200/51.03, 51.05, 518; 307/85, 139; 713/300, 713/320
See application file for complete search history.

(56) References Cited

U.S. PATENT DOCUMENTS

| 5,900,684 | A | * | 5/1999 | Lam ............................... 307/139 |
| 6,169,340 | B1 | * | 1/2001 | Jones ............................. 307/64 |
| 6,459,051 | B1 | * | 10/2002 | Barkley ........................ 200/547 |
| 6,608,264 | B1 | | 8/2003 | Fouladpour |
| 7,404,091 | B1 | * | 7/2008 | Gere ............................. 713/320 |

FOREIGN PATENT DOCUMENTS

| DE | 10 2004 039810 A1 | 2/2006 |
| JP | 09 284287 A | 10/1997 |

OTHER PUBLICATIONS

International Search Report of PCT/EP2008/004804 dated Nov. 5, 2008 with English Translation.

* cited by examiner

*Primary Examiner* — John A Tweel, Jr.
(74) *Attorney, Agent, or Firm* — Venable LLP; Robert Kinberg

(57) ABSTRACT

The invention relates to a network with a number of terminals connected by lines. Data and a supply voltage for power supply of the terminals may be transmitted via said lines. At least one switching control unit and at least one switch device with a switch means are provided therefor. The switch means of the switch device may be activated or deactivated by means of operating the switch control unit. With activated switch means a terminal allocated to the switch device is switched on by being connected to a network voltage. With deactivated switch means a terminal allocated to the switch device is switched off by being disconnected from the network voltage.

20 Claims, 2 Drawing Sheets

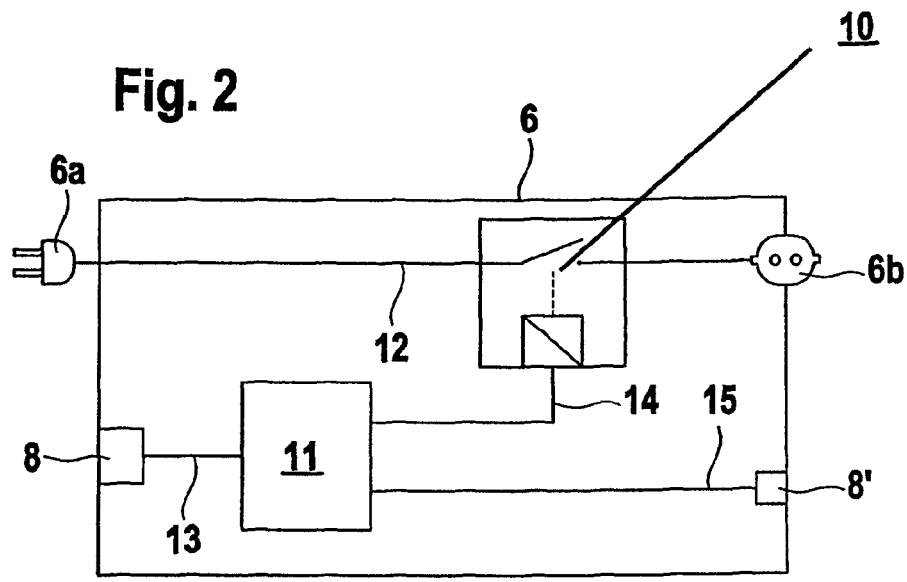
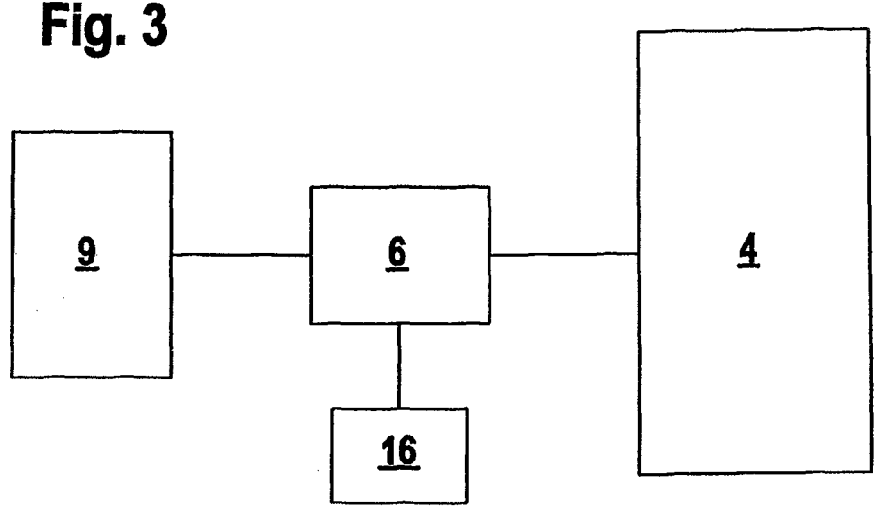

NETWORK WITH SWITCHING CONTROL UNIT FOR DISCONNECTING TERMINALS FROM NETWORK VOLTAGE

This application is a 35 U.S.C. §371 filing of International Patent Application No. PCT/EP2008/004804 filed Jun. 14, 2008, designating the United States and claiming the benefit of German Application No. 10 2007 028 180.5 filed Jun. 20, 2007.

BACKGROUND OF THE INVENTION

The invention relates to a network.

Networks of the type as discussed herein generally connect terminals via lines that can be used for exchanging data. These networks can take the form of computer networks which connect several computer units, printers, copiers, scanners and similar terminals to each other. In general, these networks can also be used to connect terminals in the form of household devices such as door controls, roller shade controls, washing machines, refrigerators and heating units. Networks of this type essentially have the purpose of allowing the various terminals to be controlled from a central location.

Networks such as the Ethernets represent one example for networks of this type. A further development of the Ethernet is the so-called Power over Ethernet, wherein for this type of network the lines are used not only to transmit data, but also to transmit a supply voltage for supplying power to the terminals. The advantage of these systems is that power-supply cables can be saved, so that the wiring expenditure for setting up the network can be reduced noticeably. However, only devices having a low power requirement, typically up to 15 Watt, can be supplied in this way.

SUMMARY OF THE INVENTION

It is the object of the present invention to provide a network of the aforementioned type, which makes possible an efficient, energy-saving and cost-saving use of the terminals.

This object is solved with the features disclosed in claim 1. Advantageous embodiments and useful modifications of the invention are described in the dependent claims.

The invention relates to a network comprising a number of terminals connected by lines, wherein data and a supply voltage for the power supply of the terminals can be transmitted via the lines. At least one switching control unit is provided, with thereto assigned at least one switching device that comprises a switching means. By triggering the switching control unit, the switching means of the switching device can be activated or deactivated. If the switching means is activated, a terminal assigned to the switching device is turned on by connecting it to a net voltage. If the switching means is deactivated, the terminal assigned to the switching device is turned off by disconnecting it from the net voltage.

The basic idea behind the invention therefore is to shut down a terminal via the switching control unit and the switching device if the terminal function is not needed at the moment. It is essential in this connection that the terminal is switched off in such a way that it is disconnected from the net voltage. The terminal therefore no longer uses any current in the switched-off state.

Terminals such as household devices, copiers, computers and the like are generally supplied with voltage by connecting them to a net voltage which is typically 230V. The switching device assigned to the terminal operates in such a way that if the switching means is activated the terminal is connected to the net voltage and if the switching means is deactivated, the connection between the terminal and the net voltage is interrupted, meaning no current is flowing to the terminal.

The present invention consequently differs from the known network solutions which, to be sure, also require the deactivation of terminals via central control units. However, this deactivation is possible only by moving the respective terminal to a stand-by state in which the terminal continues to draw current.

In comparison to the aforementioned systems, it is possible to achieve a significant energy saving with the network according to the invention.

The switching control unit or units of a particularly advantageous embodiment of the invention is (are) used for a time-driven or event-driven switching of the terminals to the activated or the deactivated state via the switching devices, such that the activation times of the terminals can be optimized.

For example, if the network comprises a computer with associated printer, the printer can always be switched on after the computer is switched on, so that the printer is available to the computer.

When switching on the computer, a DSL modem with associated router as additional terminal can furthermore also be switched on, so that immediate Internet access is available to the computer.

In general, terminal users such as backup servers or also household devices such as washing machines can always be activated if they are supplied with electrical power via local power sources such as solar cells or heating units with power/heat coupling.

Cascading arrangements of switching control units in particular can also be used for control tasks of this type, such that with a plurality of terminals, a coordinated switching on and switching off is possible. One example of this are the larger computer networks of companies for which the computers of individual departments can be switched off at different times in the evening, depending on the working hours, by using a first switching control unit. Following this, the network infrastructure together with the first, subordinated switching control unit is separated from the mains supply with the aid of superimposed switching control units. Systems of this type can generally also be used for generating control functions. For the aforementioned example, a control signal can thus be generated in the superimposed computer unit and sent to the person in charge of the power supply if a computer is still activated and connected to the network in the evening, starting at a specific point in time.

It is particularly advantageous to use a separate, specific data protocol for the transmission of data between the individual switching control units as well as to the terminals. As a result, a generally accessible, universal protocol is created for switching the terminals on and off.

Within the meaning of a universal applicability of the network according to the invention, it is furthermore especially advantageous to integrate the switching devices into the terminals, meaning to provide the terminals with the necessary hardware requirements for a network-controlled switching on and switching off.

One essential feature of the network according to the invention is that the supply voltage for supplying power to the terminals is transmitted together with the data via the transmission lines. The supply voltage, for example, can be embodied as Power over Ethernet supply voltage, wherein this supply voltage generally is not sufficient for supplying power to terminals that are operated with net voltage. However, this supply voltage can be used to connect the terminal to the net voltage or to disconnect it from the net voltage.

By adding or blocking the supply voltage via the switching control unit, the switching means of the associated switching device can be activated or deactivated, so that the terminal assigned to the switching unit can either be supplied with net voltage or can be disconnected from the net voltage.

The control function of the switching control unit is generally adapted to the design of the respective switching device, in particular the therein integrated switching means. The switching means in general can take the form of semiconductor switches or, in particular, also relays.

For the case where the switching means of the switching device is a monostable relay, the switching means is activated by connecting it to a supply voltage with the aid of the switching control unit. The monostable relay is accordingly deactivated and the terminal switched off by shutting off the supply voltage via the switching control unit.

The switching device in that case can have a very simple design. It is furthermore advantageous that the switching state of the terminal is always known to the switching control unit because this state clearly depends on whether or not supply voltage is present at the monostable relay. However, the monostable relay uses current when it is switched on.

To correct this disadvantage, a bistable relay can be used in place of the monostable relay for the switching means in the switching device. In that case, the switching states of the relay are changed via control voltage pulses that are generated in the switching control unit. The switching states themselves are stable even without the supply of power, meaning no current need be supplied to the relay for maintaining one or both switching states.

However, the actual switching state of the terminal in the switching control unit cannot be securely detected because the switching state of the bistable relay is generally changed with the aid of a control voltage pulse, preferably a supply voltage pulse, meaning the control voltage pulse activates as well as deactivates the bistable relay. To correct this disadvantage, the switching control unit transmits requests at predetermined intervals to the terminals, for example in the form of data signals. If the switching control unit does not receive signal responses to those inquiries over a longer period of time, the switching control unit recognizes that the terminal is switched off.

In the event that terminals in the network are switched off automatically, in particular with a timed control and with the aid of one or several switching control units, the user may want to have the option of manually switching on a terminal, so that this unit is quickly available.

With the previously mentioned example of a computer network for a company, the network according to the invention can also function to automatically shut down copiers in addition to computers, printers and other EDP devices.

A mechanical switch can be assigned to the switching device for turning the copier, or in general the terminal, on and off and thus providing the user with the option of using a copier briefly, if necessary. By activating the mechanical switch, the previous shutdown of the terminal via the switching control unit can be reversed, so that the terminal is again switched on.

If the switching means is embodied as a monostable relay, the activation of the mechanical switch does not activate the switching means and thus the terminal directly, but indirectly via the switching control unit.

In contrast, with a switching means embodied as a bistable relay, the mechanical switch can act directly upon the switching means and can thus change the switching state of the switching means and also the terminal.

The invention in general can be used in networks which transmit via the lines not only data but also the supply voltage for the power supply to the terminals, wherein it is especially advantageous to use the invention in Power over Ethernet systems.

BRIEF DESCRIPTION OF THE DRAWINGS

The invention is explained in further detail in the following with the aid of the drawings, showing in:
FIG. 2: A schematic representation of a switching device configured for the network according to FIG. 1;
FIG. 3: A switching control unit with a switching device and associated switch for activating or deactivating a terminal in a network according to FIG. 1.

DETAILED DESCRIPTION OF THE EMBODIMENTS

Figure 1:
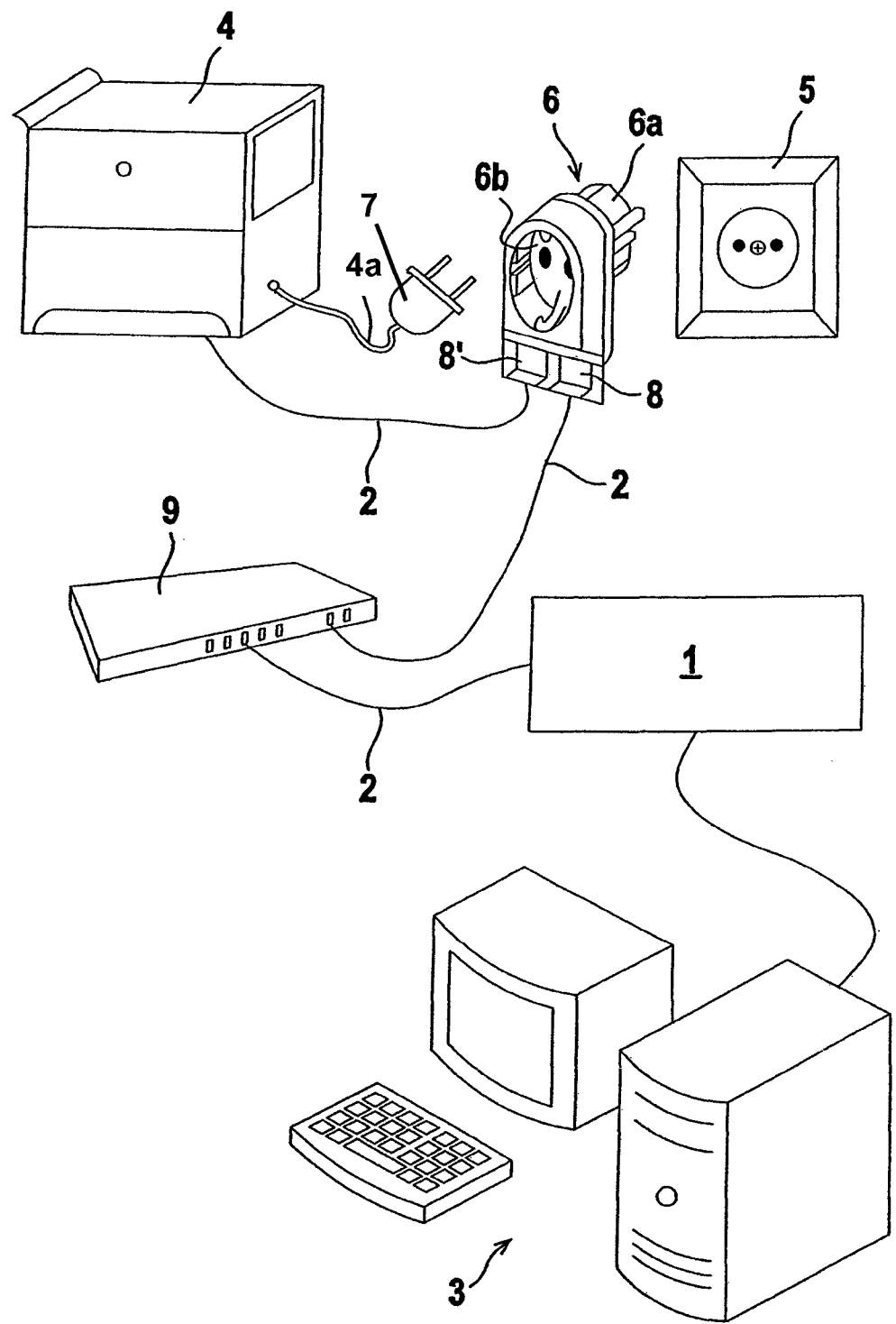
FIG. 1: A schematic representation of a network.

The exemplary embodiment shown in FIG. 1 is an extremely simplified representation of the network 1 according to the invention. For the present case, the network 1 forms an Ethernet system for which the components are connected via lines 2 in the form of Ethernet lines for the transmission of data. The network for the exemplary embodiment is a so-called Power over Ethernet system which, in addition to the data, also transmits a supply voltage in the form of a direct voltage for the power supply of the participating components. However, only participating components with a power consumption of up to approximately 15 Watt can be supplied with this voltage. Components with higher power consumption must be connected to a net voltage for the power supply.

These types of networks in general comprise computer units, wherein at least one computer unit 3 is used for controlling the data transmission via the network 1.

Different types of terminals 4 can furthermore be connected to the network 1, wherein FIG. 1 shows a copier as example for such a terminal 4. In general, terminals 4 of this type can be EDP devices, but can also be household devices such as washing machines and the like. In principle, these terminals 4 can be devices that are connected via a connection 5, a plug receptacle in the present case, to the net voltage which in particular is 230V.

The terminal 4 according to FIG. 1 is assigned a switching device 6, wherein for the present case the switching device 6 takes the form of a separate power pack. However, the switching device 6 can in principle also be integrated into the terminal 4.

According to FIG. 1, the switching device 6 is embodied as an adapter. The adapter comprises a first adapter component 6a which can be inserted into the connector socket used for the connection 5. The adapter also comprises a second adapter component 6b into which a plug 7 of the terminal 4 can be inserted, so as to connect it to the net voltage. Plug 7 of terminal 4 may be connected to terminal 4 via cord 4a.

Two Ethernet jacks 8, 8' are located on the switching device 6 for connecting the lines 2 of the network 1. The terminal 4 is connected via these lines 2 and via the switching device 6 to a switching control unit 9, which in turn is connected via lines 2 to the components of the network 1. That is to say, the terminal 4, the switching device 6 and the switching control unit 9 all represent components of the network 1.

The switching control unit 9 is preferably a processor-controlled unit with several ports to which several switching devices 6 can be connected which, in turn, have several terminals 4 assigned to them.

The switching function of the switching device 6 is controlled by the switching control unit 9. For realizing this function, the switching device 6 is provided with a switching means 10, as shown in FIG. 2, which takes the form of a relay in the present case. In general, the switching means 10 can also take the form of a semiconductor switch. The switching device 6 furthermore comprises a logic circuit 11. The switching control unit 9 is provided with a line 12 that conducts the net voltage and connects the two adapter components 6a, b. The switching means 10 is provided in this line 12. An additional line 13 extends from the Ethernet jack 8 to the logic circuit 11. The data and the supply voltage which are simultaneously transmitted via the lines 2 are separated in this logic circuit 11. The supply voltage in the present case is a direct voltage of 48V which forms the Power over Ethernet voltage of the present Ethernet system.

For this, a first line 14 extends from the logic circuit 11 to the switching means 10 while a second line 15 extends from the logic circuit 11 to the Ethernet jack 8'.

The line 13 from the Ethernet jack 8 to the logic circuit 11 is used for transmitting the data as well as the supply voltage, meaning the Power over Ethernet voltage. As a result of the separation of the data and the supply voltage in the logic circuit 11, only data are transmitted via the line 15 extending to the Ethernet jack 8'. The line 14, on the other hand, is used only to transmit the supply voltage for controlling the switching means 10. Depending on whether or not the supply voltage is present at the switching means 10, the net voltage is either supplied or not supplied via the switching means 10 to the second adapter component 6b.

The switching device 6 is activated with the aid of the switching control unit 9, wherein a supply voltage is either applied or not applied to the switching means 10 for the activation.

Once the relay forming the switching means 10 is activated in this way, the terminal 4 is connected to the net voltage with the aid of the transmitted switching signal, meaning the terminal 4 is activated and ready for operation. If the switching means 10 is deactivated, the connection between the terminal 4 and the net voltage is interrupted and the terminal 4 is consequently switched off, wherein the terminal 4 in the switched-off state does not carry any current and does not consume any power.

The arrangement according to FIG. 1 generally can be expanded to permit the control of several switching devices 6 with the aid of a single switching control unit 9, wherein respectively one terminal 4 can be switched on or switched off with one switching device 6. Also possible are cascading arrangements of switching control units 9 and associated switching devices 6.

A time-driven or event-driven activation of subordinate switching control units 9 or switching devices 6 can be achieved with the aid of the higher-ranking switching control unit 9. A specific data protocol is generally provided for the data exchange between the switching control units 9 themselves, as well as for the data exchange with the associated terminals 4 and their switching devices 6.

FIG. 3 illustrates an expanded version of the arrangement according to FIG. 1, wherein the switching device 6 is additionally provided with a mechanical switch that is embodied as button 16 in the present case. According to FIG. 3, the button 16 is connected directly to the switching device 6. To provide a better overview, only the switching control units 9 and the terminal 4 of the arrangement according to FIG. 1 are shown herein.

The relay for the switching device 6 according to FIG. 2 can generally be embodied as monostable or bistable relay.

In the event that the switching means 10 of the switching device 6 is embodied as a monostable relay, this relay is activated and the terminal 4 switched on by permanently supplying voltage to the relay, meaning the Power over Ethernet voltage, with the aid of the switching control unit 9. To switch off the terminal 4, the supply voltage is shut down by the switching control unit 9, meaning the relay is deactivated because voltage is no longer supplied to the relay.

Since the switching state of the relay is clearly determined by whether or not a supply voltage is present at the relay and since the feeding of the supply voltage to the relay is specified by the switching control unit 9, the switching state of the relay is always known to the switching control unit 9.

With the expanded version shown in FIG. 3, the deactivation of the relay can be counteracted by manually pushing the button 16, thereby switching on the terminal 4. For this, the switching device 6 is activated by pushing the button 16, such that a Power over Ethernet signal is briefly emitted via the logic circuit 11, which signal is recorded in the switching control unit 9. This Power over Ethernet signal functions as a control signal for the switching control unit 9, such that the switching control unit permanently supplies Power over Ethernet voltage to the switching device 6 and the relay, thereby causing the terminal 4 to be switched on continuously.

This activation step is preferably combined with a timed control that is implemented in the switching control unit 9 for switching off the terminal 4 after a predetermined time interval following the activation initiated by pushing the button 16.

In the event that the switching means 10 of the switching device 6 is embodied as bistable relay, the switching state of the relay is changed with the aid of a control voltage pulse generated in the switching control unit 9 and the terminal 4 is thus switched on or switched off. The bistable relay in the process is permanently reversed through the control voltage pulse, so that the terminal 4 as a result of this reversal remains permanently in this state. The control voltage pulse in this case is a supply voltage pulse, meaning a Power over Ethernet voltage pulse.

It is furthermore advantageous that the bistable relay can be switched between two switching states with the aid of the control voltage pulse emitted the switching control unit 9, wherein these states are stable even if no voltage is supplied to the relay. That is to say, the relay only uses power when changing the switching state, but not when it remains in one of the switching states.

However, the switching control unit 9 does not know the switching state of the terminal 4 since the relay is switched by the switching control unit 9 from the "activated" state to the "deactivated" state and back again with one and the same control voltage pulse.

To obtain information on the switching state of the terminal 4, the switching control unit 9 at predetermined intervals transmits requests to the terminal 4, for example in the form of digital signals. If the terminal 4 is turned on, the terminal sends back response signals to the switching control unit 9. Since the network 1 for the present case is embodied as Ethernet system, the data signal emitted by the switching control unit 9 is a special Ethernet signal, the so-called ICMP-ECHO-REQUEST. If the switching control unit 9 subsequently receives an ICMP-ECHO-RESPONSE signal from the terminal 4, this represents a confirmation that the terminal 4 is activated. If the switching control unit 9 does not receive such a data signal over a longer period of time from the terminal 4, it is a confirmation that the terminal 4 is not switched on.

With the expanded version shown in FIG. 3, the bistable relay can be switched directly by pushing the button 16, meaning without intervention of the switching control unit 9, and the switching state of the terminal 4 can thus be changed.

The invention claimed is:

1. A network comprising a number of terminals that are connected by lines, wherein data and a supply voltage for supplying power to the terminals can be transmitted via the lines, characterized in that at least one switching control unit is provided with thereto assigned at least one switching device that comprises a switching means, wherein the switching means of the switching device can be activated or deactivated by triggering the switching control unit, wherein once the switching means is activated a terminal that is assigned to the switching device is switched on by connecting it to a net voltage, and wherein if the switching means is deactivated the terminal that is assigned to the switching device is switched off by disconnecting it from the net voltage.

2. The network according to claim 1, characterized in that the switching means takes the form of a relay.

3. The network according to claim 1, characterized in that the switching device is provided with a logic circuit for triggering the switching means.

4. The network according to claim 1, characterized in that a mechanical switch is assigned to the switching device.

5. The network according to claim 4, characterized in that this mechanical switch can be used to switch the switching means.

6. The network according to claim 1, characterized in that the relay is embodied as a monostable relay.

7. The network according to claim 6, characterized in that the monostable relay is activated by supplying it with voltage via the switching control unit and that the monostable relay is deactivated by switching off the supply voltage via the switching control unit.

8. The network according to claim 6, characterized in that the terminal assigned to the switching device can be switched on via the mechanical switch in such a way that the switching device briefly feeds the supply voltage into the line to the switching control unit as a result of the switching of the mechanical switch, whereupon the switching control unit permanently supplies the supply voltage to the switching device for activating the monostable relay.

9. The network according to claim 8, characterized in that following a specific time interval after switching on the terminal with the aid of the mechanical switch, this terminal is switched off via the switching control unit.

10. The network according to claim 1, characterized in that the relay is a bistable relay.

11. The network according to claim 10, characterized in that the switching state of the bistable relay can be changed with the aid of a control voltage pulse generated in the switching control unit.

12. The network according to claim 11, characterized in that the control voltage pulse is a supply voltage pulse.

13. The network according to claim 10, characterized in that a request is transmitted to the terminal to determine the current switching state of the terminal and, if the terminal is activated, a response signal is transmitted from the terminal to the switching control unit.

14. The network according to claim 10, characterized in that the switching state of the bistable relay can be changed with the aid of the mechanical switch.

15. The network according to claim 1, characterized in that the switching device is integrated into the associated terminal.

16. The network according to claim 1, characterized in that several terminals that can be switched via switching devices are assigned to a switching control unit.

17. The network according to claim 1, characterized in that the switching control units are arranged in a cascading arrangement.

18. The network according to one of claim 1, characterized in that a time-driven activation of the switching devices can be realized with the switching control unit or with each switching control unit.

19. The network according to claim 1, characterized in that an event-driven activation of the switching devices can be realized with the switching control unit or with each switching control unit.

20. The network according to claim 1, characterized in that a special data protocol is provided for the data exchange between the terminals and the switching control unit.

* * * * *